United States Patent
Mays et al.

(10) Patent No.: US 10,787,368 B2
(45) Date of Patent: Sep. 29, 2020

(54) PROCESS FOR PRODUCING LITHIATED TRANSITION METAL OXIDES

(71) Applicant: BASF CORPORATION, Florham Park, NJ (US)

(72) Inventors: William C. Mays, Farmington Hills, MI (US); Diana F. Wong, Rochester Hills, MI (US); Xue Liu, Beachwood, OH (US); Benjamin Reichman, Rochester Hills, MI (US); Martin Panchula, Beachwood, OH (US); Gary Yacobian, Beachwood, OH (US)

(73) Assignee: BASF Corporation, Florham Park, NJ (US)

( * ) Notice: Subject to any disclaimer, the term of this patent is extended or adjusted under 35 U.S.C. 154(b) by 185 days.

(21) Appl. No.: 16/000,931

(22) Filed: Jun. 6, 2018

(65) Prior Publication Data
US 2019/0375651 A1 Dec. 12, 2019

(51) Int. Cl.
C01D 15/00 (2006.01)
C01D 15/02 (2006.01)
C01G 53/04 (2006.01)

(52) U.S. Cl.
CPC ............ *C01D 15/02* (2013.01); *C01G 53/04* (2013.01); *C01P 2004/60* (2013.01)

(58) Field of Classification Search
CPC ........ C01D 15/02; C01G 53/04; C01G 51/04; C01G 45/02; C01P 2004/50–61
USPC ...................................................... 423/179.5
See application file for complete search history.

(56) References Cited

U.S. PATENT DOCUMENTS

| | | | |
|---|---|---|---|
| 6,045,771 A | 4/2000 | Matsubara et al. | |
| 6,395,250 B2 | 5/2002 | Matsubara et al. | |
| 6,617,073 B1* | 9/2003 | Matsumoto ............ | C01G 51/42 429/218.1 |
| 8,298,706 B2 | 10/2012 | Christian et al. | |
| 9,028,564 B2 | 5/2015 | Nelson et al. | |
| 2004/0185344 A1 | 9/2004 | Barker et al. | |
| 2004/0216280 A1 | 11/2004 | Tesumoto et al. | |
| 2004/0253516 A1* | 12/2004 | Yuasa ................. | H01M 4/0435 429/231.3 |
| 2006/0188780 A1* | 8/2006 | Fujii ................... | C01G 45/1228 429/223 |
| 2013/0236784 A1 | 9/2013 | Lin et al. | |
| 2015/0118560 A1 | 4/2015 | Ewald et al. | |

(Continued)

FOREIGN PATENT DOCUMENTS

WO 9841476 A1 9/1998
WO 2015/183568 * 12/2015

(Continued)

*Primary Examiner* — Steven J Bos
(74) *Attorney, Agent, or Firm* — Dinsmore & Shohl LLP; Weston R. Gould (57) ABSTRACT

Provided are processes for the formation of electrochemically active materials such as lithiated transition metal oxides that solve prior issues with throughput and calcination. The processes include forming precursor materials into agglomerates prior to calcination. The use of the agglomerates improves gas flow into and out of the materials thereby improving calcination results, electrochemical properties of the resulting materials, and allows for use of high temperature kilns not previously suitable for such materials thereby lowering production costs.

24 Claims, 1 Drawing Sheet

(56) References Cited

U.S. PATENT DOCUMENTS

2015/0280250 A1  10/2015  Anglin et al.
2017/0012286 A1* 1/2017  Washida ............... H01M 4/505

FOREIGN PATENT DOCUMENTS

WO   2016/048862    *  3/2016
WO   2016083185 A1   6/2016

* cited by examiner

PROCESS FOR PRODUCING LITHIATED TRANSITION METAL OXIDES

FIELD

The invention relates to the formation of electrochemically active materials suitable for use in primary or secondary batteries, and more particularly to the formation of lithiated transition metal oxides.

BACKGROUND

The formation of electrochemically active materials for use in batteries typically involves two primary steps. First, a precursor is formed by such as by co-precipitation reactions whereby transition metals are intermixed in the form of hydroxides or carbonates to form a precursor powder. This precursor is then mixed with a lithium compound and calcined under high temperature to form an active material.

There is great desire to improve the electrochemical performance of the active material formed in these processes as well as costs of production. Efforts are typically directed to compositional or structural alterations in the active materials themselves to improve characteristics such as charge density and storage capacity. Studies attempting to achieve improved calcination suffer from poor throughput making materials produced by these processes expensive to produce.

Prior efforts, while successful in many respects, have yet to achieve full theoretical capacity of these active materials. As such there remains a need for improved processes of forming electrochemically active materials for use in an electrochemical cell.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

Provided are methods that improved the resulting electrochemical capacity of electrochemically active materials, such as lithiated transition metal oxides. Processes include formation of a lithiated transition metal oxide that includes intermixing a transition metal precursor and a lithium compound to form an active material precursor, forming an agglomerate of the active material precursor by mixing the active material precursor with an agglomeration agent, and heating the agglomerate to a temperature optionally of 700° C. or greater in an oxidizing atmosphere, the heating for a calcination time sufficient to form a lithiated transition metal oxide. Without being limited to one particular theory, it is believed that improved transport of actives in the oxidizing atmosphere is achieved by agglomerate formation, optionally by agglomerate formation to granule sizes within predefined ranges, improves the overall resulting material. Agglomeration may be aided by the addition of an agglomeration agent to the precursor materials prior to agglomerate formation. An agglomeration agent may be a saccharide, carboxymethyl cellulose, hydroxypropyl methylcellulose, hydroxypropyl cellulose, water, polyethylene glycol, polyvinylpyrrolidone, starch, molasses, or combinations thereof. The agglomeration agent may be present at 0.5 weight percent to 55 weight percent. Improved results may be achieved by forming agglomerates with a granule size of 500 μm or greater, optionally 500 μm to 15 mm. In some aspects, an active material precursor further includes a dry binder, an alkali-containing compound, a pore-forming compound, or combinations thereof. In some aspects, the molar ratio of lithium to transition metal in the active material precursor is 0.8 to 1.1. In some aspects, the transition metal precursor includes Ni, Co, Mn, Al, Mg, Ti, Zr, Nb, Hf, V, Cr, Sn, Cu, Mo, W, Fe, Si, B, other transition metals, or rare earth elements. A lithium compound is optionally lithium hydroxide, lithium oxide, lithium carbonate, lithium nitrate, lithium sulfate, lithium acetate, lithium peroxide, lithium hydrogen carbonate, a lithium halide, or combinations thereof. Optionally, an active material precursor may further include a pore former, optionally a cellulose fiber, carbon, graphite, starch, polyether ether ketone, wood flour, a super absorbent polymer, or combinations thereof. The step of heating is optionally within a belt furnace, vertical calciner, or grate kiln. Optionally, the step of heating is in an oxidizing atmosphere, optionally an oxygen or ozone enriched atmosphere, where enriched is relative to the oxygen or ozone level in air. The step of heating is optionally at a temperature is 700° C. to 1000° C. A calcination time is optionally 1-60 hours. The formed agglomerates optionally have a tap density of 0.4 to 1.7, a bulk porosity of 50% to 95%, a pore volume fraction of 20% or greater, or any combination thereof. The lithiated transition metal oxide is optionally crushed and optionally precharged. The resulting lithiated transition metal oxide material optionally has a capacity well in excess of a material calcined as a powder, such as a powder with an particle size of less than 500 μm. In some aspects, the specific capacity is in excess of 250 mAh/g, optionally in excess of 275 mAh/g, optionally in excess of 300 mAh/g, optionally in excess of 325 mAh/g, optionally in excess of 350 mAh/g. Such may be an improvement in specific capacity of 50% or greater.

BRIEF DESCRIPTION OF THE DRAWINGS

The aspects set forth in the drawings are illustrative and exemplary in nature and not intended to limit the subject matter defined by the claims. The following detailed description of the illustrative aspects can be understood when read in conjunction with the following drawings and in which:

DETAILED DESCRIPTION

Figure 1:
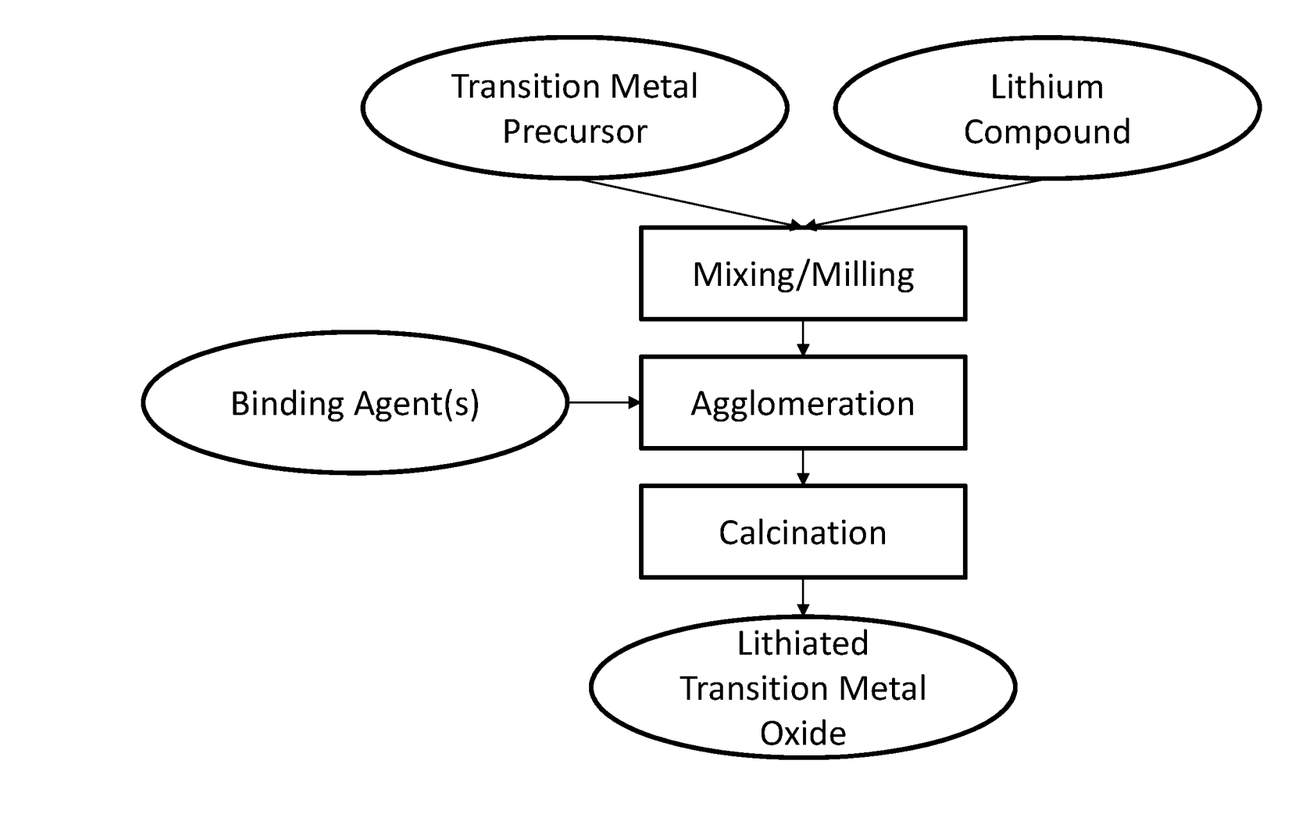
FIG. 1 illustrates a schematic of a process of forming a lithiated transition metal oxide as provided herein according to some aspects.

The following description of particular aspect(s) is merely exemplary in nature and is in no way intended to limit the scope of the invention, its application, or uses, which may, of course, vary. The disclosure is provided with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

The present disclosure is directed to new processes of forming electrochemically active materials for use in an electrochemical cell. Instead of focusing on composition or structure of such active materials, the present invention improves the mass transport of gasses into and out of a precursor powder during calcination. It was found that intentionally forming relatively large agglomerates of precursor material prior to calcination, optionally with particular characteristics of porosity and density, improves throughput of the calcination reaction, improves material handling in calcination and downstream processes, and often improves the resulting capacity of the materials. Prior methods of producing electrochemically active materials try to maintain a powder configuration to allow for free flowing material. The present processes are in direct contradiction to prior methods in that intentional agglomeration is introduced into the material prior to calcination resulting in large granules, typically with granule sizes on the order of millimeter(s) (mm) in diameter. It is these agglomerates of material that are subjected to the calcination reaction. The processes also have the added advantages of being suitable for use in higher throughput furnaces such as vertical tube furnaces or belt kilns and are not limited to calcination in a saggar such as in prior systems.

In addition, the provided processes address the need for reduced cost at least due to greater throughput and more effective formation of electrochemically active materials. Estimates of cost of production indicate that the use of large agglomerate as described herein in the production of electrochemically active materials will be reduced by half or more.

As used herein, the term "lithiated transition metal oxides" refers to metal oxides, optionally mixed metal oxides, that contain lithium and at least one transition metal where the material has been subjected to calcination.

As used herein, the term "transition metal precursor" refers to a transition metal in the form of a hydroxide, oxide, oxyhydroxide, carbonate, or nitrate.

As used herein, the term "lithium compound" refers to a lithium containing composition in the form of a lithium hydroxide, lithium oxide, lithium carbonate, lithium nitrate, lithium sulfate, lithium acetate, lithium peroxide, lithium hydrogen carbonate, or a lithium halide.

As used herein, the term "active material precursor" refers to a product of an intermixing between a lithium compound and a transition metal precursor.

As used herein, the term "calcination" is understood as a thermal treatment in the presence of an oxidizing atmosphere so as to cause a chemical transformation of the material.

A temperature as provided herein is optionally absolute as described or about the temperature defined as ±10° C. from the absolute number as described.

An "agglomerate" as used herein is a collection of material into a discernable structure with increased diameter relative to the material in powder form, typically with a granule size of 500 micrometers (µm) or greater.

Processes are provided of forming an electrochemically active material suitable for reversibly intercalating Li. Optionally, an electrochemically active material is a transition metal oxide, an iron phosphate, or titanate active materials. Illustrative examples of transition metal oxide electrochemically active materials include, but are not limited to chemistries based on LiNiMO where M is any transition metal, rare earth or combinations thereof, LiMnO systems that may or may not include other elemental constituents, or LiCoO systems that may or may not include other elemental constituents. While much of the present disclosure is directed to transition metal oxide electrochemically active materials, it is appreciated that the processes of agglomeration and calcining are equally attributable to other electrochemically active materials as well.

It was found that by forming an agglomerate of active material precursor(s) prior to subjecting the material to a calcination reaction improved transport of the oxidizing atmosphere or components thereof is achieved as well as improved capacity of the resulting material. The agglomerate structure is also maintained during calcination, also reducing caking and stickiness traditionally observed in powder calcination, and improving the ability to discharge the calcined material from the sager, and downstream milling processes. As such, a process as provided in this disclosure includes: intermixing a transition metal precursor and a lithium compound to form an active material precursor; forming an agglomerate of the active material precursor by mixing the active material precursor with an agglomeration agent; and heating the agglomerate to a temperature of 700° C. or greater in an oxidizing atmosphere, the heating for a calcination time sufficient to form a lithiated transition metal oxide.

It is appreciated that a process includes forming an active material precursor prior to forming an agglomerate. An active material precursor is formed by intermixing a Li compound with a transition metal precursor. The intermixing of these two components was found to improve the overall electrochemical properties resulting from the process. A lithium compound is any suitable lithium compound known in the art for formation of electrochemically active materials, optionally a lithium hydroxide, lithium oxide, lithium carbonate, lithium nitrate, lithium sulfate, lithium acetate, lithium peroxide, lithium hydrogen carbonate, a lithium halide, or combinations thereof.

The lithium compound is intermixed with a transition metal precursor. A transition metal precursor may be formed by any method known in the art. In some aspects, a transition metal precursor may be formed by a co-precipitation reaction whereby hydroxides, carbonates, nitrates, or other known suitable transition metal form is used to form a solution. By adjusting the pH of the solution, precipitations of transition metals are formed to form a transition metal precursor.

The step of intermixing of the transition metal precursor and the lithium compound may be performed at various temperatures, optionally from 0° C. to 100° C. or even greater, optionally from 10° C. to 40° C. The intermixing may be performed at any suitable pressure, optionally about 1 atmosphere.

A transition metal may be any transition metal suitable for use in an electrochemical cell. Illustrative examples of a transition metal include, but are not limited to Ni, Co, Mn, Al, Mg, Ti, Zr, Nb, Hf, V, Cr, Sn, Cu, Mo, W, Fe, Si, B, or other transition metals. Optionally, a transition metal as used herein includes or excludes a rare earth metal. A rare earth metal is optionally La, Nd, Y, among others. In some aspects, a transition metal precursor includes Ni, Mn, Co, Fe, or combinations thereof. In some aspects, a transition metal precursor includes Ni.

An advantage of the processes as provided herein are that raw precursor materials may be used negating the requirement for highly purified or refined materials. For example, when nickel is used as a transition metal precursor, the Ni may be mine grade. A transition metal precursor may be mine grade or may be further processed or refined.

The transition metal precursor is intermixed with a lithium compound to form an active material precursor. The intermixing is optionally preformed so as to form a substantially homogenous material whereby excellent mixing of the materials is achieved and intimate contact between the Li compound and the transition metal precursor is achieved. A high shear mixer may be used such as a Kawata Super Piccolo mixer or Eirich mixer. Any suitable mixing blade may be used such as a pin type blade, star type blade, or micro-granulation type blade. The tip speed of the blade correlates to the amount of shear or friction delivered to the material. A tip speed is optionally 5-30 meters/second (m/s), optionally 10-25 m/s.

The stoichiometric ratio of Li to transition metal may be any suitable ratio, optionally from 0.8 to 1.1 or any value or range therebetween. Optionally, the ratio of Li to transition metal may be 0.9 to 1.1, optionally 0.95 to 1.1, optionally 0.95 to 1.05. In the case of a Ni containing active material precursor, the stoichiometric ratio is measured as the ratio between Li and Ni in the material. The stoichiometric ratio of Li to transition metal may be obtained by any method known in the art. Illustratively, inductively coupled plasma atomic emission spectroscopy (ICP) or atomic absorption spectroscopy using standard methods optionally as described by J. R. Dean (*Practical Inductively Coupled Plasma Spectroscopy*, Chichester, England: Wiley, 2005, 65-87) and Welz and Sperling (*Atomic Absorption Spectrometry*, 3rd ed., Weinheim, Germany: Wiley VCH, 1999, 221-294). Illustratively, the chemical composition of each sample may be examined by a Varian Liberty 100 inductively-coupled plasma (ICP) system.

An aspect of the provided processes in the formation of one or more agglomerates of the active material precursor prior to subjecting the precursor to a calcination reaction. As such, the active material precursor is formed into agglomerates that may be defined by parameters such as granule size, porosity, density, among others. Granule size may be determined using any known process. Optionally, a granule size may be obtained by sieving the material such as in aspects where granule size is too large for a standard particle size analyzer. Optionally, granule size is obtained using a particle analyzer such as a SympaTec Helos particle size analyzer which is capable of measuring particle size up to over 8 millimeters (mm). In the processes as provided herein, an agglomerate is formed to a granule size of 500 micrometers (μm) or greater where granule size is as related to the diameter of a sphere using methods as recognized in the art. Optionally, a granule size is 500 μm to 15 millimeters (mm) or any value or range therebetween. Optionally, a granule size is at or greater than 500 μm, 600 μm, 700 μm, 800 μm, 900 μm, 1 mm, 2 mm, 3 mm, 4 mm, 5 mm, 6 mm, or greater. Optionally, a granule size is 500 μm to 10 mm, 500 μm to 9 mm, 500 μm to 8 mm, 500 μm to 7 mm, 500 μm to 6 mm, 500 μm to 5 mm, 500 μm to 4 mm, 1 mm to 15 mm, 1 mm to 10 mm, 1 mm to 9 mm, 1 mm to 8 mm, 1 mm to 7 mm, 1 mm to 6 mm, 1 mm to 6 mm, 2 mm to 15 mm, 2 mm to 10 mm, 2 mm to 9 mm, 2 mm to 8 mm, 2 mm to 7 mm, 2 mm to 6 mm, 2 mm to 6 mm, 2 mm to 5 mm, or 2 mm to 4 mm.

By formation of aggregates with granule sizes as claimed additional cost benefits are achieved by significantly reducing production costs relative to particle or powder calcination processes. These cost savings are most readily apparent with a granule size of 500 μm to 5 mm with even greater savings with a granule size of 500 μm to 3 mm. A cost factor estimate of the cost of making the materials based on fill level of a sagger, which influences material throughput for a given piece of equipment reveals that the cost factor for powder is 2 times higher than for a 2 mm agglomerate indicating the cost to calcin powder is twice the amount of the 2 mm agglomerate. The resulting cost factors are illustrated in Table 1:

TABLE 1

| Cost factor of production of powder relative to various agglomerate sizes. | |
|---|---|
| Agglomerate size (mm) | Cost Factor |
| 0.5 to 2 | 1 |
| 2 | 1 |
| 2.8 | 1 |
| 4 | 1.3 |
| 5 | 1.7 |
| >5 | 2 |
| Powder | 2 |

An agglomerate may be formed by combining an active material precursor with an agglomeration agent. An agglomeration agent is a compound capable of promoting formation of an agglomerate by binding particles of active material precursor to a suitable granule size of the resulting agglomerate. An agglomeration agent is optionally a saccharide, carboxymethyl cellulose, hydroxypropyl methylcellulose, hydroxypropyl cellulose, water, polyethylene glycol, polyvinylpyrrolidone, starch, molasses, or combinations thereof. In some aspects, an agglomeration agent is selected from the group consisting of a saccharide, water, polyethylene glycol, polyvinylpyrrolidone, starch, molasses, or combinations thereof. Optionally, an agglomeration agent is selected from the group consisting of carboxymethyl cellulose, hydroxypropyl methylcellulose, hydroxypropyl cellulose. Optionally, an agglomeration agent is water, optionally exclusively water.

An agglomeration agent is combined with an active material precursor at a weight percentage of 0.5% to 55% or any value or range therebetween where weight percent is relative to the active material precursor. Optionally, an agglomeration agent is present at a weight percent of 0.1% to 50%, optionally 1% to 50%, optionally 0.1% to 30%, optionally 0.1% to 5%, optionally 0.1% to 3%, optionally 0.1% to 10%, optionally 1%, 2%, 3%, 4%, 5%, 6%, 7%, 8%, 9%, 10%, 11%, 12%, 13%, 14%, 15%, 16%, 17% 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%.

The agglomeration agent may be combined with the active material precursor by simple addition, spraying, or other suitable method.

The active material precursor, agglomeration agent, and one or more optional components such as a pore forming agent or others, are intermixed with enough force from rolling or shearing to encourage seed agglomeration. The formation of the agglomerate may be performed in the same or a different vessel from the step of intermixing the lithium compound with the transition metal precursor. The agglomerates are then grown on the seed until a desired size or range of sizes of the resulting agglomerates are achieved. In the formation of the agglomerate the rotational or agitation speed of the mixer is optionally adjusted relative to the intermixing of the transition metal precursor and the lithium compound to promote seed formation and subsequent agglomerate formation. The mixing to form an agglomerate may be continued until agglomerates of a desired size or homogeneity are achieved. For example, a step of forming an agglomerate may utilize a step of distributing the binder for a first time and an agglomerate growth phase for a second time (agglomeration formation time). An agglomeration formation time may be from seconds to minutes, optionally 2 to 20 minutes.

It was found that the agglomeration step typically provides excellent uniformity of granule size of the agglomerates. If greater uniformity is desired, following or during the agglomeration step, the resulting agglomerates may be sieved to isolate or obtain a desired size or size uniformity.

In addition to an agglomeration agent, one or more optional additives may further be included with the agglomeration agent. An optional additive may be a pore former, dry binder, an alkali-containing compound, or combinations thereof. In some aspects, a pore former is used. Illustrative examples of a pore former include cellulose fiber, carbon (optionally in the form of activated charcoal), graphite, starch, polyether ether ketone, wood flour, a super absorbent polymer, or combinations thereof.

A resulting agglomerate may have a designed porosity, density, or combination thereof. The addition of one or more optional additives may introduce increased porosity, decrease or otherwise adjust the tap density of the resulting agglomerate. By increasing the porosity of the resulting agglomerate increasing gas penetration within the system during calcination may be achieved as a result of the combination of pore volume within the bed of agglomerates as well as introduced pore volume within the agglomerates themselves allowing both improved penetration of gas and heat through the bed and through each of the individual agglomerates during calcination.

An agglomerate may be characterized by a porosity. Porosity may be measured by standard procedures recognized in the art. A bulk porosity of agglomerates is optionally from 40% to 95% or any value or range therebetween, optionally 50% to 90%, optionally 60% to 90%, optionally 70% to 90%. In some aspects, the porosity is at or greater than 40%, 45%, 50%, 55%, 60%, 65%, 70%, 75%, 80%, 85%, 90%, or 95%.

Porosity measurements may be performed on the aggregates to determine cumulative pore volumes, average pore diameter or cross sectional dimension or other measurement such as by processes recognized in the art, optionally by $N_2$ adsorption/desorption isotherms by the process by Lowell, et al., *Characterization of Porous Solids and Powders: Powder Surface Area and Porosity*, Dordrecht, The Netherlands: Springer, 2006, pp. 101-156.

The presence of porosity inside the agglomerates leads to a pore volume fraction. A pore volume fraction of an agglomerate is optionally at or greater than 20%, optionally 30%, optionally 40%, optionally 50%, optionally 60%, optionally 70%. In some aspects, the pore volume fraction is optionally 20% to 70%.

An agglomerate bed density may be measured with a desired tap density test. A tap density of agglomerates may be measured by methods recognized in the art. A tap density is optionally 0.4 grams per milliliter (g/ml) to 1.7 g/ml or any value or range therebetween. Optionally, a tap density is from 0.4 g/ml to 1.5 g/ml, optionally 0.4 g/ml to 1.0 g/ml, optionally 0.5 g/ml to 1.5 g/ml, optionally 0.5 g/ml to 1 g/ml.

The resulting agglomerates may be dried following formation. Drying may be at a temperature of 25° C. to 300° C. in ambient atmosphere and about 1 atm. Drying may be accomplished in a drying time of 1 hour to 24 hours.

Following agglomerate formation, the resulting materials are subjected to a solid phase reaction such as calcination. The formation of the agglomerate prior to the calcination increases the penetration of oxygen or other reactants in the oxidizing atmosphere and possibly heat transfer to improve the overall oxidation during the reaction process. Improved pore structure introduced to the bed volume by the agglomerate granule size relative to powder alone or also in the presence of pore structure within the agglomerates themselves provides pathways for gas transfer in the system. This allows for the use of systems that were not previously available for use with electrochemically active materials during the calcination reaction. Typical processes used with powders of prior methods, particularly during mass production, were typically performed in saggars with a certain bed depth so as to achieve suitable product throughput. A saggar may be used for the calcination process of the present disclosure, but the calcination process is improved due to the use of aggregates and optionally porous aggregates. In addition to standard kilns and saggars, the use of aggregates also allows the use of other heating devices such as, but not limited to, a vertical calciner, a belt furnace, grate kiln, roller hearth kiln, or other such device.

The calcination process is performed at a calcination temperature and in an oxidizing atmosphere and for a calcination time suitable for the formation of a lithiated transition metal oxide. A calcination temperature is optionally any temperate at or above 700 degrees Celsius (° C.). A calcination temperature is optionally from 700° C. to 1000° C. or any value or range therebetween. Optionally, a calcination temperature is from 750° C. to 950° C., optionally 750° C. to 900° C.

Calcination is performed in an atmosphere suitable to oxidize the agglomerated active material precursor. An atmosphere may include a suitable amount or concentration of an oxidizing agent, optionally oxygen, ozone or other suitable agent, the oxidizing atmosphere optionally in the form of an oxygen enriched atmosphere whereby the concentration of oxygen is greater than in ambient air. Optionally, an atmosphere is air. The atmosphere is optionally provided at a suitable pressure, optionally about 1 atmosphere. The atmosphere is optionally contacted with the agglomerate at a flow velocity to provide a desired number of atmosphere exchanges in the oven. The number of atmosphere exchanges per hour is optionally 3 to 150, optionally 3 to 100, optionally 5 to 150, optionally 5 to 100.

A resulting lithium transition metal oxide is optionally subjected to one or more post-calcination processes. In some aspects a lithium transition metal oxide is subjected to crushing, grinding or other process so as to reduce the size of the aggregate or to powderize the aggregate to improve downstream processes, to ensure homogeneity of the mixture and improve its intermixing with a binder, conducting compound or other material suitable for the formation of an electrode.

The lithium transition metal oxide may be used in a primary or secondary electrochemical cell. When used in a primary electrochemical cell, the lithium transition metal oxide may be subjected to a precharging step as is recognized in the art prior to its incorporation into a primary cell.

Various aspects of the present invention are illustrated by the following non-limiting examples. The examples are for illustrative purposes and are not a limitation on any practice of the present invention. It will be understood that variations and modifications can be made without departing from the spirit and scope of the invention.

EXAMPLES

Example 1

An agglomerate is formed using refined nickel hydroxide. 2.8 kg nickel hydroxide (as described in U.S. Pat. Nos. 6,432,580 and 6,444,363) and 1.2 kg lithium carbonate ($Li_2CO_3$) (milled battery grade lithium carbonate, Rockwood Lithium Inc., Kings Mountain, N.C.). The materials are dry mixed to homogeneity using an Eirich RV02E mixer with the agitator run at 20 m/s and the pan run at 37.5 rpm. Dry mixing is performed for 2 minutes.

An agglomeration agent (water, 0.58 kg) is added into the mixing chamber at a rate of 0.6 kg/min with the agitator at 20 m/s and the pan running at 37.5 rpm. Wet mixing is performed for 2 min with agglomeration seed formation for 2 min with the agitator at 20 m/s and the pan rotating at 75 rpm. Agglomeration is performed for 5 additional minutes with the agitator at 5 m/s and the pan spinning at 75 rpm. The total liquid to solid weight ratio is 0.145 and designed Li:Ni atomic ratio is 1.075. The wetted agglomerates are dried in oven at 120° C. overnight. The dried agglomerates are separated by sieving to obtain uniform granule populations based on granule size from: less than 2 mm; 2 mm; 2.8 mm; 4 mm; 5 mm; and greater than 5 mm. The various agglomerate sizes are subjected to physical and electrochemical analyses.

The resulting agglomerates are loaded into saggars (4.1 cm×9.1 cm×1.6 cm=59 cm) with loadings of 10 grams/saggar (0.25 cm bed depth), 20 grams/saggar (0.5 cm bed depth) and 30 grams/saggar (0.75 cm bed depth). The saggars are placed into a box furnace and calcined at 885° C. with flowing $O_2$ at a flow rate of 21 SCFH. Calcination is performed for 2 hours.

The calcined granules are crushed by hand using a mortar and pestle for downstream processes.

The grinded particles are then precharged for electrochemical analyses.

Control powder materials are made with the same relative amounts of NiOH and $Li_2CO_3$ with the same intermixing and calcination parameters with the exception that these materials are not agglomerated prior to the calcination step.

The agglomerated material and control material are subjected to electrochemical analyses in half cell configuration against an Hg/HgO reference electrode and in 30% KOH solution. The agglomerated materials are formed into a cathode powder for testing by mixing with teflonized acetylene black (TAB-2) at 50% w/w and compacting onto a nickel screen.

Cells are discharged continuously at constant charge of 10 mA/g down to −0.8V vs. an Hg/HgO reference electrode. The resulting capacities of the materials are illustrated in Table 2.

TABLE 2

Capacities of materials made to various granule sizes prior to calcination.

| Agglomerate size (mm) | Capacity (mAh/g) 10 g load | Capacity (mAh/g) 20 g load | Capacity (mAh/g) 30 g load |
|---|---|---|---|
| <2 | 387 | 367 | 155 |
| 2 | 382 | 368 | 221 |
| 2.8 | 396 | 377 | 74 |
| 4 | 374 | 325 | 31 |
| 5 | 357 | 276 | 19 |
| >5 | 287 | 208 | 65 |
| Powder | 380 | 220 | 63 |

The materials calcined at all agglomeration sizes show excellent specific capacity. Materials with an agglomeration size of 2 mm to 4 mm show the highest capacity. At 20 g loading (deeper bed volumes), all agglomerate sizes of 5 mm or less show greatly improved capacity compared to similar loadings of powder material. At lower loading of 10 g in the saggar granules of less than 2 mm to 4 mm show the greatest capacity relative to powder prepared materials of identical preparation chemistry.

The materials are subjected to determination of oxidation state and Li/Ni stoichiometric ratio. Oxidation state of the Ni in the materials is determined by chemical titrimetry substantially as taught by Dagget and Meldrun, *Quantitative Analysis*, Boston: Health, 1955, 408-9. Materials are also analyzed for the stoichiometric ratio of Li to Ni by ICP analyses using a Varian Liberty 100 inductively-coupled plasma (ICP) system. Particle size is determined using a Microtrac SRA 150 (Standard Range Analyzer) particle size analyzer. The oxidation state of the materials of various granule sizes are illustrated in Table 3.

TABLE 3

Characteristics of $LiNiO_2$ materials.

| Agglomerate size (mm) | Ox. State | PS (u) | ICP Li/Ni (a/o) |
|---|---|---|---|
| <2 | 2.84 | 3.3 | |
| 2 | 2.84 | 3.5 | 1.08 |
| 2.8 | 2.81 | 3.4 | |
| 4 | 2.8 | 3.2 | |
| 5 | 2.79 | 3.1 | |
| >5 | 2.83 | 1.5 | |

The designed stoichiometric ratio of Li/Ni was 1.075 which corresponds well to the 1.08 ratio determined by ICP.

Example 2

Exemplary lithiated transition metal oxides of the $LiNiO_2$ type are synthesized using mine grade nickel hydroxide (nickel dihydroxide) and lithium carbonate ($Li_2CO_3$) (milled battery grade lithium carbonate, Rockwood Lithium Inc., Kings Mountain, N.C.). The materials are mixed to homogeneity using a Kawata Super Piccolo mixer.

An agglomeration agent (water, corn starch (powder) to 3 wt %, molasses to 5 wt %, or cellulose (powder) to 0.5 wt %) is added into the mixing chamber. Molasses was Sweet N Neat 65 from Archer Daniel Midland and was pre-mixed with water to obtain a solution to be sprayed into the powder during agglomeration. The total liquid to solid ratio is between 0.46 and 0.61, and designed Li:Ni ratio is 1.1.

The resulting agglomerates are separated by sieving to obtain uniform granule populations based on granule size <2 mm, 2 mm, 2.8 mm, 4 mm, 5 mm, and greater than 5 mm. The various agglomerate sizes are subjected to physical and electrochemical analyses.

The resulting agglomerates are loaded into saggars (4.1 cm×9.1 cm×1.6 cm=59 $cm^3$) with loadings of 10 grams/saggar (0.25 cm bed depth), 20 grams/saggar (0.5 cm bed depth) and 30 grams/saggar (0.75 cm bed depth). The saggars are placed into a box furnace and calcined at 885° C. with flowing $O_2$ at a flow rate of 21 SCFH (~100 exchange/HR). Calcination is performed for 2 hours.

Solid density of the particles is determined by He expansion pycnometer using a Micrometrics Accupyc 1330 pycnometer. Sphere density is measured directly and by sand methods. Tap density is determined by standard protocols. The resulting sphere porosity and bulk porosities are calculated using standard measures. The results for 4 mm granules using various agglomeration agents are presented in Table 4.

TABLE 4

| Samples (4 mm) | Solid density (g/ml) | Sphere density [direct] (g/ml) | Sphere density [sand] (g/ml) | Tap density (g/ml) | Sphere porosity (%) | Bulk porosity (%) |
| --- | --- | --- | --- | --- | --- | --- |
| water | 3.16 | 0.998 | 0.72 | 0.5 | 73 | 84 |
| Corn Starch 3% | | 1.096 | 0.74 | 0.44 | 70 | 86 |
| Molasses 5% | 3.08 | 1.03 | 0.7 | 0.45 | 72 | 85 |
| Cellulose 0.5% | | 0.98 | 0.71 | 0.43 | 73 | 86 |

Samples of the transition metal oxide materials are pre-charged and subjected to electrochemical analyses in half cell configuration, determination of oxidation state and yields performed as in Example 1. The resulting parameters for 2.8 mm agglomerate formed materials and those of control materials agglomerated in the absence of binder are illustrated in Table 5.

TABLE 5

| Binder | % binder | Yield on calcination/yield expected | Ox. State | Capacity (mAh/g) |
| --- | --- | --- | --- | --- |
| control | 0 | 0.72/0.75 | 2.84 | 348 |
| cornstarch | 3 | 0.69/0.73 | 2.83 | 380 |

TABLE 5-continued

| Binder | % binder | Yield on calcination/yield expected | Ox. State | Capacity (mAh/g) |
| --- | --- | --- | --- | --- |
| molasses | 5 | 0.70/0.72 | 2.83 | 349 |
| cellulose | 0.5 | 0.72/0.75 | 2.83 | 322 |

The resulting parameters for 4 mm agglomerate formed materials and those of control materials agglomerated in the absence of binder are illustrated in Table 6.

TABLE 6

| Binder | % binder | Yield on calcination/yield expected | Ox. State | Capacity (mAh/g) |
| --- | --- | --- | --- | --- |
| control | 0 | 0.71/0.75 | 2.82 | 305 |
| cornstarch | 3 | 0.69/0.73 | 2.85 | 339 |
| molasses | 5 | 0.69/0.72 | 2.83 | 321 |
| cellulose | 0.5 | 0.71/0.75 | 2.85 | 383 |

Example 3

Additional exemplary lithiated transition metal oxides of the $LiNiO_2$ type are synthesized using 1.75 kilograms (kg) mine grade nickel hydroxide (nickel dihydroxide) and 0.75 kg lithium carbonate ($Li_2CO_3$) (milled battery grade lithium carbonate, Rockwood Lithium Inc., Kings Mountain, N.C.). The materials are mixed to homogeneity using a Eirich mixer.

Agglomeration is achieved using the agglomeration agent water (1.2 kg) added into the mixing chamber. The resulting agglomerates grow uniformly with time. Following the agglomeration time greater than 90% of the granules fall into a granule size of 1 mm to 5 mm. The designed Li:Ni ratio is 1.07.

The resulting agglomerates are separated by sieving to obtain relatively uniform granule populations based on granule size 1-2 mm, 2-4 mm, 4-4.8 mm, or 6-8 mm. The various agglomerate sizes are subjected to physical and electrochemical analyses.

The resulting agglomerates are loaded into saggars (10 cm×10 cm×9 cm) at loadings as illustrated in Table 7. The saggars are placed into a box furnace and calcined at 885° C. with flowing $O_2$ at a flow rate of 21 SCFH (+100 exchange/HR). Calcination is performed for 20 hours.

Solid density of the particles is determined by He expansion pycnometer using a Micrometrics Accupyc 1330 pycnometer. Sphere density is measured directly and by sand methods. Tap density is determined by standard protocols. The resulting sphere porosity and bulk porosities are calculated using standard measures.

Samples of the transition metal oxide materials are pre-charged and subjected to electrochemical analyses in half cell configuration, determination of oxidation state, etc. are performed as in Example 1. Results are illustrated in Table 7.

TABLE 7

| Granule Size | Loading (g)/cm | Equiv sagger load (Kg) | Li/Ni | C(%)/RH | Oxidation State | Average Capacity (mAh/g) |
|---|---|---|---|---|---|---|
| 1-2 mm | 163/2 | 1.17 | 1.07 | 0.58 | 2.81 | 407 |
| 2-4 mm | 163/2 | 1.17 | 1.07 | 0.71 | 2.81 | 406 |
| 4-4.8 mm | 163/2 | 1.17 | 1.07 | 0.55 | 2.82 | 405 |
| 6-8 mm | 163/2 | 1.17 | 1.07 | 0.62 | 2.82 | 367 |
| 1-2 mm | 585/9 | 4.18 | 0.9 | 0.45 | 2.87 | 312 |
| 2-4 mm | 752/9 | 5.97 | 0.9 | 0.52 | 2.82 | 310 |

Example 4

The effects of the addition of various pore formers are analyzed using the base materials of Example 2. The agglomerates are formed with the agglomeration agent water and further adding a pore former that is either starch, activated charcoal powder (ACP), sorbitol, BWW4 cellulose, or BO cellulose where the pore former is added prior to agglomeration to 10 wt %. The resulting agglomerates are loaded into saggars (4.1 cm×9.1 cm×1.6 cm=59 cm$^3$) with loadings of 10 grams/saggar (0.25 cm bed depth). The saggars are placed into a box furnace and calcined at 885° C. with flowing $O_2$ at a flow rate of 21 SCFH (~100 exchange/HR). Calcination is performed for 2 hours. The resulting oxidation state, porosity, and capacities are analyzed as was performed in Example 2 with results for 2.8 mm granule size agglomerates illustrated in Table 8.

TABLE 8

| Pore Former | Oxidation State | Average Capacity (mAh/g) |
|---|---|---|
| Control | 2.83 | 308 |
| Starch | 2.82 | 343 |
| ACP | 2.83 | 408 |
| Sorbitol | 2.84 | 302 |
| BO | 2.85 | 313 |
| BWW4 | 2.85 | 330 |

The addition of a pore former increases the resulting capacity of the material with the greatest increase observed with the use of activated charcoal (ACP) or starch.

Various modifications of the present invention, in addition to those shown and described herein, will be apparent to those skilled in the art of the above description. Such modifications are also intended to fall within the scope of the appended claims.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular aspects of the invention, but is not meant to be a limitation upon the practice thereof. The following claims, including all equivalents thereof, are intended to define the scope of the invention.

We claim:

1. A process for the formation of a lithiated transition metal oxide comprising:
   intermixing a transition metal precursor and a lithium compound to form an active material precursor;
   forming an agglomerate of the active material precursor by mixing the active material precursor with an agglomeration agent, wherein the agglomeration agent comprises a saccharide, carboxymethyl cellulose, hydroxypropyl methylcellulose, hydroxypropyl cellulose, polyethylene glycol, polyvinylpyrrolidone, starch, molasses, or combinations thereof, or wherein the agglomeration agent consists of water; and
   heating the agglomerate to a temperature of 700° C. or greater in an oxidizing atmosphere, the heating for a calcination time sufficient to form the lithiated transition metal oxide.

2. The process of claim 1 wherein the agglomerate has a granule size of 500 µm or greater.

3. The process of claim 1 wherein the agglomerate has a granule size of 500 µm to 15 mm.

4. The process of claim 1 wherein the active material precursor further comprises a dry binder, an alkali-containing compound, a pore-forming compound, or combinations thereof.

5. The process of claim 1 wherein the molar ratio of lithium to transition metal in the active material precursor is 0.8 to 1.1.

6. The process of claim 1 wherein the agglomeration agent is present at 0.5 weight percent to 55 weight percent.

7. The process of claim 1 wherein the transition metal precursor comprises Ni, Co, Mn, Al, Mg, Ti, Zr, Nb, Hf, V, Cr, Sn, Cu, Mo, W, Fe, Si, B, other transition metals, or rare earth elements.

8. The process of claim 1 wherein the lithium compound is selected from the group consisting of lithium hydroxide, lithium oxide, lithium carbonate, lithium nitrate, lithium sulfate, lithium acetate, lithium peroxide, lithium hydrogen carbonate, a lithium halide, and combinations thereof.

9. The process of claim 1 wherein the active material precursor further comprises a pore former selected from the group consisting of a cellulose fiber, carbon, graphite, starch, polyether ether ketone, wood flour, a super absorbent polymer, and combinations thereof.

10. The process of claim 1 further comprising crushing the lithiated transition metal oxide.

11. The process of claim 1 wherein the step of heating is within a belt furnace, vertical calciner, or grate kiln.

12. The process of claim 1 wherein the oxidizing atmosphere is an oxygen enriched atmosphere.

13. The process of claim 1 wherein the agglomerate has a tap density of 0.4 to 1.7.

14. The process of claim 1 wherein the agglomerate has a bulk porosity of 50% to 95%.

15. The process of claim 1 wherein the agglomerate has a pore volume fraction of 20% or greater.

16. The process of claim 1 wherein the temperature is 700° C. to 1000° C.

17. The process of claim 1 wherein the time is 1 to 60 hours.

18. A process for the formation of a lithiated transition metal oxide comprising:
   intermixing a nickel containing material and a lithium compound to form an active material precursor;
   forming a plurality of agglomerates of the active material precursor by mixing the active material precursor with an agglomeration agent, wherein the agglomeration agent comprises a saccharide, carboxymethyl cellulose, hydroxypropyl methylcellulose, hydroxypropyl cellulose, polyethylene glycol, polyvinylpyrrolidone, starch, molasses, or combinations thereof, or wherein the agglomeration agent consists of water, and wherein the agglomerates have an average granule size of 500 µm to 8 mm; and heating the agglomerate to a temperature of 700° C. or greater in an oxidizing atmosphere, the heating for a calcination time sufficient to form the lithiated transition metal oxide.

19. The process of claim 18 wherein the nickel containing material comprises nickel monoxide, nickel hydroxide, nickel oxyhydroxide, nickel sesquioxide, nickel carbonate, nickel nitrate, or any combination thereof.

20. The process of claim 18 wherein the nickel containing material further comprises Al, Co, Mn, or combinations thereof.

21. The process of claim 18 wherein the lithium compound is selected from the group consisting of lithium hydroxide, lithium oxide, lithium carbonate, lithium nitrate, lithium sulfate, lithium acetate, lithium peroxide, lithium hydrogen carbonate, a lithium halide, or combinations thereof.

22. The process of claim 18 wherein the agglomeration agent is present at 0.5 weight percent to 35 weight percent of the agglomerate as a whole.

23. The process of claim 18 wherein the active material precursor further comprises a pore forming agent.

24. The process of claim 18 wherein the step of heating is within a belt furnace, vertical calciner, or grate kiln.

* * * * *